(12) United States Patent
Kodati

(10) Patent No.: US 12,434,843 B2
(45) Date of Patent: Oct. 7, 2025

(54) ADJUSTABLE WIDTH PASSENGER SEAT

(71) Applicant: B/E Aerospace, Inc., Winston-Salem, NC (US)

(72) Inventor: Sambasiva Rao Kodati, Vinjaram (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 205 days.

(21) Appl. No.: 18/209,648

(22) Filed: Jun. 14, 2023

(65) Prior Publication Data

US 2024/0051665 A1    Feb. 15, 2024

(30) Foreign Application Priority Data

Aug. 9, 2022  (IN) .............. 202241045427

(51) Int. Cl.
  *B64D 11/06* (2006.01)
  *A47C 1/03* (2006.01)
  (Continued)

(52) U.S. Cl.
  CPC ...... *B64D 11/0644* (2014.12); *B64D 11/0647* (2014.12); *A47C 1/03* (2013.01);
  (Continued)

(58) Field of Classification Search
  CPC ............ B64D 11/0644; B64D 11/0639; B64D 11/693; B64D 11/0647; B60N 2/777;
  (Continued)

(56) References Cited

U.S. PATENT DOCUMENTS 2,800,947 A * 7/1957 Thiem ................ B60N 2/02246
                                                    296/68.1
3,966,146 A    6/1976 Roberts
(Continued)

FOREIGN PATENT DOCUMENTS

EP    0294086 A1    12/1988
EP    0443664 B1    8/1991
(Continued)

OTHER PUBLICATIONS

Paur, Jason (2013). Transforming Airline Seats Adjust Width For Each Passenger. Retrieved from https://www.wired.com/2013/11/adjustable-airline-seats/.
(Continued)

*Primary Examiner* — Syed A Islam
(74) *Attorney, Agent, or Firm* — Suiter Swantz IP

(57) ABSTRACT

A passenger seat including laterally repositionable armrests wherein a seat bottom width adjusts automatically according to the lateral armrest position. Adjustment mechanisms positioned on the opposing lateral sides of the seat carry the armrests and are driven inward and outward to laterally reposition the armrests. In some embodiments, the adjustment mechanism includes levers drive by a connecting frame coupled to a motion driver such as a rack-and-pinion mechanism positioned in the seat bottom. In embodiments, the cushion utilizes stored internal energy from the cushion construction to expand when the armrests are repositioned laterally outward.

15 Claims, 9 Drawing Sheets

(51) Int. Cl.
  *A47C 7/54* (2006.01)
  *A47C 19/04* (2006.01)
  *B60N 2/02* (2006.01)
  *B60N 2/75* (2018.01)

(52) U.S. Cl.
  CPC ............... *A47C 7/54* (2013.01); *A47C 19/04* (2013.01); *B60N 2002/0288* (2013.01); *B60N 2/777* (2018.02)

(58) Field of Classification Search
  CPC .......... B60N 2/773; B60N 2/99; B60N 2/995; B60N 2002/0288; A47C 19/04; A47C 1/03
  See application file for complete search history.

(56) References Cited

U.S. PATENT DOCUMENTS

| | | | | |
|---|---|---|---|---|
| 4,500,136 | A * | 2/1985 | Murphy | A47C 7/029 297/284.9 |
| 4,636,000 | A * | 1/1987 | Nishino | B60N 2/986 297/284.9 |
| 4,881,702 | A * | 11/1989 | Slettebak | B64D 11/0693 244/118.6 |
| 5,284,379 | A | 2/1994 | Arnold et al. | |
| 5,975,639 | A * | 11/1999 | Wilson | A47C 1/03 297/411.35 |
| 7,578,551 | B2 * | 8/2009 | Linero | B64D 11/0693 297/42 |
| 8,028,958 | B2 * | 10/2011 | Kneller | B64D 11/0601 244/118.6 |
| 8,141,952 | B2 * | 3/2012 | Poniatowski | B60N 2/986 297/452.4 |
| 8,251,427 | B2 * | 8/2012 | Lindsay | B60N 2/062 296/64 |
| 9,878,647 | B2 | 1/2018 | Uno et al. | |
| 10,427,552 | B2 * | 10/2019 | Guy | B60N 2/58 |
| RE47,872 | E * | 2/2020 | Scott | B64D 11/0601 |
| 10,625,647 | B1 * | 4/2020 | McDevitt | B60N 2/72 |
| 10,667,612 | B2 * | 6/2020 | Matlin | A47C 9/002 |
| 10,703,225 | B2 * | 7/2020 | Ito | B60N 2/02246 |
| 11,052,794 | B2 * | 7/2021 | Hunsaker | B60N 2/26 |
| 11,613,191 | B2 * | 3/2023 | Koshi | B60N 2/767 297/116 |
| 2006/0208552 | A1 | 9/2006 | Nishiwaki | |
| 2016/0137104 | A1 | 5/2016 | Bortolon et al. | |
| 2021/0169226 | A1 | 6/2021 | Richardson | |

FOREIGN PATENT DOCUMENTS

| | | |
|---|---|---|
| EP | 0680843 A1 | 11/1995 |
| EP | 0747286 A2 | 12/1996 |
| EP | 1645459 B1 | 4/2006 |
| GB | 2280363 B | 8/1997 |
| GB | 2506664 A | 4/2014 |
| WO | 9529843 A1 | 11/1995 |

OTHER PUBLICATIONS

European Search Report dated Feb. 28, 2024; European Application No. 23190095.2.

* cited by examiner

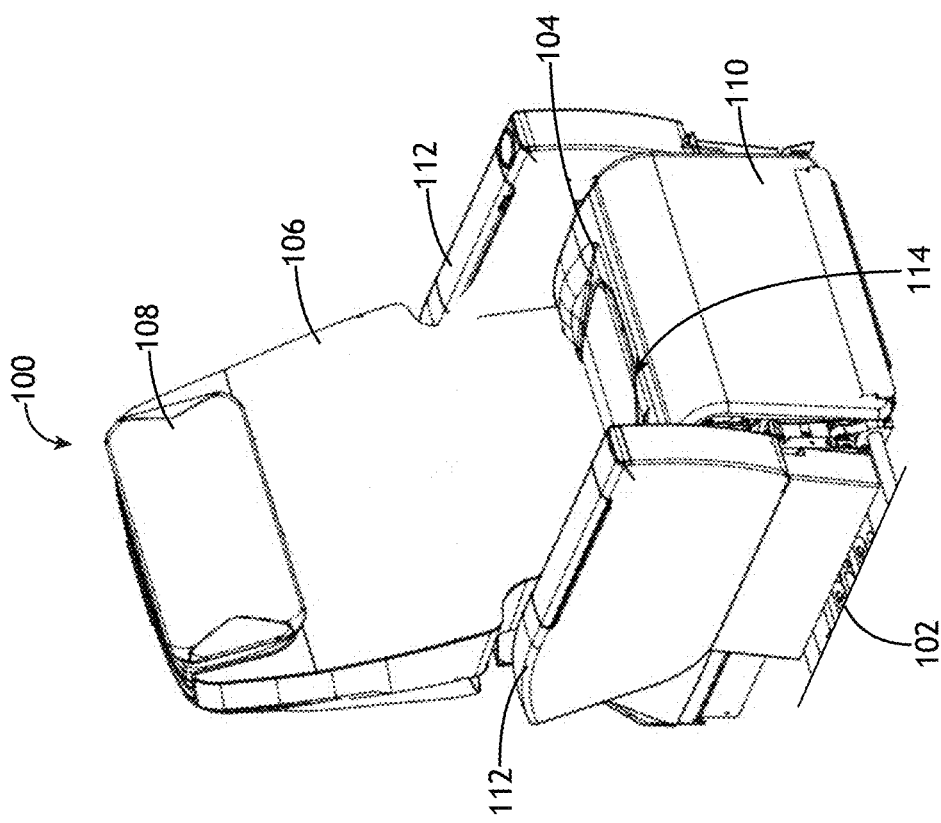
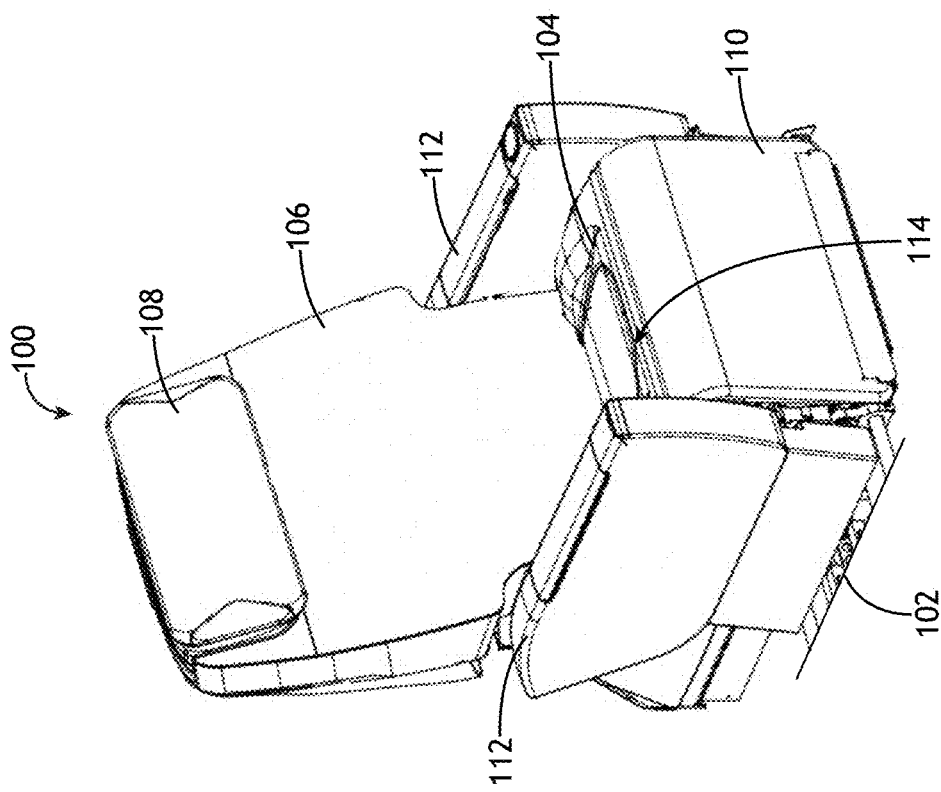

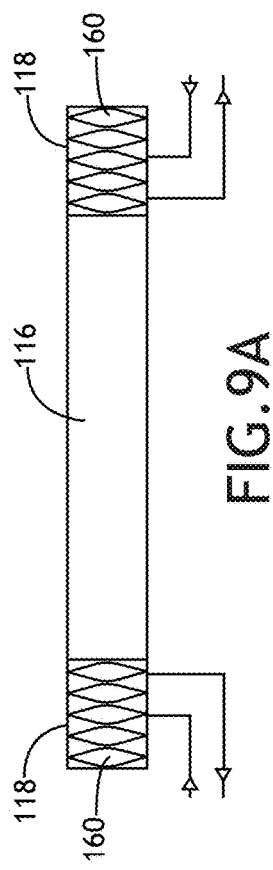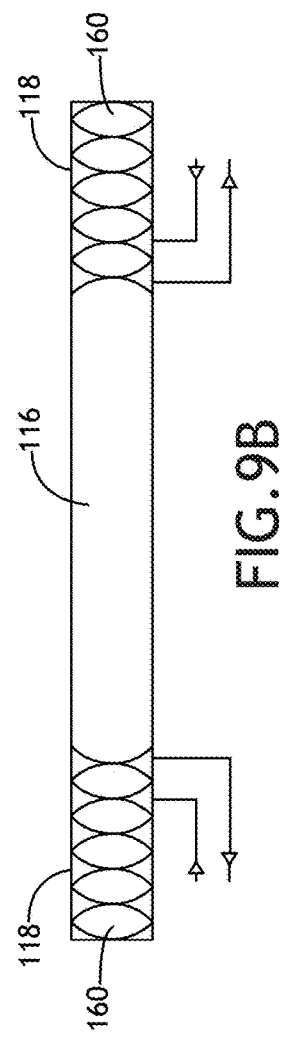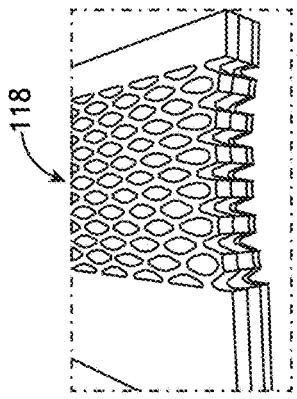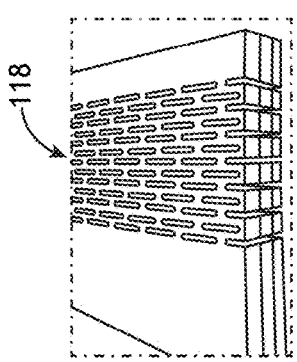

ADJUSTABLE WIDTH PASSENGER SEAT

CROSS-REFERENCE TO RELATED APPLICATION

This application claims the benefit of priority of Indian Provisional Application No. 202241045427 filed Aug. 9, 2022, which is hereby incorporated by reference in its entirety.

TECHNICAL FIELD AND BACKGROUND

The present disclosure relates generally to passenger seats such as aircraft passenger seats, and more particularly to a width adjustable passenger seat including a seat bottom configured to adjust automatically according to the lateral armrest position.

Passenger seats are designed according to average passenger dimensions. In the case of aircraft, passenger seats may be designed according to the $95^{th}$ percentile adult male passenger. In other words, based on a sampling of adult males, the designed seat should be able to accommodate 95% of those sampled. Assuming adult males are the largest anticipated passengers in terms of physical dimensions, smaller passengers such as the $95^{th}$ percentile female and $95^{th}$ percentile child should also fit in the designed seat. While the fit may not be optimal or ergonomic for all occupants, and even less so for those at the upper and lower ends of the range and for females and children, the intention is to design the seat for safety and reasonable comfort. Seat elements that contribute to safety and comfort include the seat bottom width, seat bottom length, backrest width, backrest height, and armrest positions, among others.

Adjustment capabilities in economy class seats are limited by typical seat row construction and relatively short seat pitch. In premium class seats, singular seats and greater seat pitch provide opportunities for more and better adjustment capabilities. For example, premium class seats may be equipped with adjustable leg rests, headrests, and backrests that recline to a steep angle, among others. Even with the multitude of currently available adjustment capabilities, there are still some seat adjustments that are not made. For example, seat width is typically fixed and determined by the location of the spreaders and armrest attachment locations. For some passengers, the seat width and armrest spacing may be uncomfortable, particularly for those passengers at the limits of the seat design. For example, the armrests may be positioned too wide for small body types and too narrow for large body types.

Therefore, what is needed are further adjustment capabilities for seats to better customize seat fit for each passenger. In addition, what is needed is a link between seat elements that works in conjunction to provide comfort and support such that adjustment of one component automatically adjusts the other component without having to adjust components separately.

BRIEF SUMMARY

Broadly speaking, the present disclosure is directed to passenger seat constructions in which seat elements are linked such that adjusting one seat element automatically adjusts the other seat element. In embodiments, the seat elements may include the armrests and the seat bottom cushion, wherein the width of the seat bottom cushion adjusts automatically according to the lateral armrest position. In use, for example, increasing the spacing between the armrests automatically increases the width of the seat bottom cushion, and vice versa. Whereas lateral armrest position may be changed using an active system that acts on the seat frame members, seat bottom cushion width may be changed using a passive system such as an expandable bellows or the like formed in the cushion. The same principles may be applied to the backrest considering the width of the seat bottom and backrest cushions on aircraft passenger seats may be similarly constructed.

Benefits of the seat adjustment mechanisms disclosed herein include, but are not limited to, the possibility for more supportive and comfortable passenger seats, the ability to accommodate a greater percentile of passengers, and an added feature for premium seating classes.

To achieve the foregoing and other advantages, in a first aspect the present disclosure provides a passenger seat including a lower frame assembly, a first lateral adjustment mechanism positioned on a first lateral side of the lower frame assembly, a first armrest mechanism positioned on an outboard lateral side of the first lateral adjustment mechanism, a second lateral adjustment mechanism positioned on a second lateral side of the lower frame assembly, and a second armrest mechanism positioned on an outboard lateral side of the second lateral adjustment mechanism. A cushion positioned on the lower frame assembly includes a middle portion positioned between adjustable side portions wherein, in use, the adjustable side portions are configured to automatically expand as the respective first and second armrest mechanisms are repositioned laterally outward, and automatically contract as the respective first and second armrest mechanisms are repositioned laterally inward.

In some embodiments, each of the first and second lateral adjustment mechanisms includes a frame, spaced first and second levers each including first and second links attached at a rotating joint, each of the first and second links configured to interact with the lower frame assembly, and a connecting frame including a first leg attached to the first lever and a second leg attached to the second lever. In use, driving the connecting frame laterally outward relative to the lower frame assembly drives the frame laterally outward relative to the lower frame assembly, and driving the connecting frame laterally inward relative to the lower frame assembly drives the frame laterally inward toward the lower frame assembly.

In some embodiments, the frame is a vertically oriented plate and the connecting frame is oriented perpendicular to the plate.

In some embodiments, each of the first and second armrest mechanisms includes an armrest and at least one of a vertical armrest adjustment mechanism and a rotational armrest adjustment mechanism.

In some embodiments, the seat further includes at least one actuator positioned in the lower frame assembly operably coupled to the first and second lateral adjustment mechanisms.

In some embodiments, the adjustable side bellows are formed by material voids in the cushion.

In some embodiments, the adjustable bellows are pneumatically actuated and drive the armrest lateral repositioning.

In some embodiments, the at least one transverse frame member comprises a beam tube coupled at opposing ends to the first and second armrest mechanisms.

In a further aspect, the present disclosure provides an armrest mechanism attachable to a seat for laterally repositioning an armrest relative to a seat, including a frame attachable to a lateral side of a seat frame, at least one lever configured to adjust lateral spacing between the frame and the seat frame, the at least one lever including spaced first and second levers attached at a rotating joint, the first and second links configured to interact with the seat frame, a connecting frame configured to couple the at least one lever to the seat frame, and an armrest assembly attached to the frame.

In some embodiments, the armrest assembly comprises an armrest and at least one of a vertical adjustment mechanism for vertically repositioning the armrest and a rotational adjustment mechanism for angularly repositioning the armrest.

In some embodiments, the frame is a vertical plate and the connecting frame is oriented perpendicular to the vertical plate.

In some embodiments, the at least one lever includes a first lever and a second lever spaced vertically apart, and the connecting frame includes a first leg coupled to the first lever and a second leg coupled to the second lever. In use, driving the connecting frame in a first direction causes opposing ends of each of the first and second levers to converge and driving the connecting frame in a second direction opposite the first direction causes the opposing end of each of the first and second levers to converge, wherein the opposing ends of each of the first and second levers are configured to interact with the seat frame.

In some embodiments, each of the rotating joint of the first lever, the first leg, the rotating joint of the second lever, and the second leg is coupled to the frame through a vertical pivot axis formed through the frame.

In some embodiments, each of the first and second levers operates in a horizontal plane.

In some embodiments, the connecting frame and the armrest assembly are positioned on opposite sides of the vertical plate.

Embodiments of the inventive concepts may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings:

FIG. 2A is a front isometric view of the passenger seat showing the first armrest lateral position;

FIG. 2B is a front isometric view of the passenger seat of FIG. 2A showing the armrests positioned laterally outward;

FIG. 9A is a schematic diagram showing an expandable cushion element in a contracted condition;

FIG. 9B is a schematic diagram showing the expandable cushion element in an expanded condition; and FIGS. 10A-C show cushion element expansion.

DETAILED DESCRIPTION

Figure 1B:
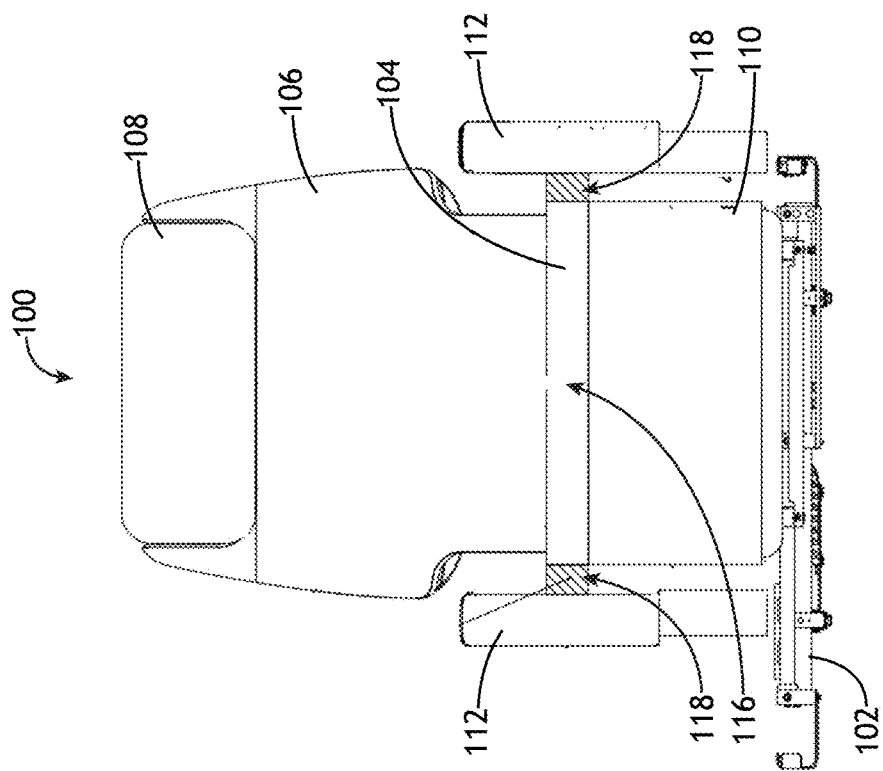
FIG. 1B is a front view of the passenger seat of FIG. 1A showing the armrests positioned laterally outward and the seat bottom cushion expanded.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Broadly speaking, the present disclosure provides embodiments of passenger seat assemblies, for instance an aircraft passenger seat assembly, equipped with laterally repositionable armrests. In use, repositioning the armrests laterally outward automatically causes the seat bottom cushion to expand through stored energy in the seat bottom cushion, and the repositioning the armrests laterally inward automatically causes the seat bottom cushion to contract through force of the armrest adjustment mechanisms against the lateral sides of the seat bottom cushion. As such, the width of the armrests and the seat bottom cushion can be adjusted, in conjunction, according to the passenger preference, to tailor the seat to the size of the occupant, to change a seat size to accommodate a size change in a laterally adjacent seat, etc.

Various directional terms are used herein to describe components movement relative to the environment and to each other. For example, the term "forward" may mean front or the direction of travel parallel to the aircraft longitudinal axis, the term "lateral" may mean to the side such as perpendicular to the aircraft longitudinal axis, the term "outward" may mean away from a longitudinal axis, and the term "inward" may mean toward a longitudinal axis. For example, in the passenger seat embodiments disclosed herein the seat includes a longitudinal axis and a forward end, and armrests movements are described with reference thereto such that lateral movement outward or repositioning outward may mean moving away from the seat longitudinal axis and lateral movement inward or repositioning inward may mean moving toward the seat longitudinal axis.

In embodiments, the lateral armrest positions are configured to be changed from a first or contracted condition in which the armrests are positioned closer together, to a second or expanded condition in which the armrests are positioned farther apart. In some embodiments, the contracted condition, also referred to herein as "contracted," may correspond to a standard or normal operating condition of the seat, whereas the expanded condition, also referred to herein as "expanded," may correspond to a non-standard or occasional operating condition of the seat. For example, the contracted condition may accommodate the 95$^{th}$ percentile occupant whereas the expanded condition may accommodate occupants falling outside of the 95$^{th}$ percentile or a particular seating preference of the passenger.

In use, a portion of the seat cushion undergoes a dimensional change with the lateral repositioning of the armrests. Specifically, at least one expandable portion of the seat cushion expands in its width dimension when the armrests are repositioned laterally outward, and contracts in its width dimension when the armrests are repositioned laterally inward. In some embodiments, the construction of the cushion itself drives the width readjustment such that the readjustment happens automatically with the lateral armrest repositioning. In some embodiments, stored energy in the compressed seat cushion causes expansion when the compressive force is removed when the armrests are repositioned laterally outward.

FIGS. 1A-2B illustrate a non-limiting example of a passenger seat, for instance a premium class aircraft passenger seat 100. The passenger seat 100 may be mounted on a frame 102 capable of adjusting the lateral seat position. In other embodiments, the passenger seat 100 may be mounted directly to the floor. As shown, the passenger seat 100 generally includes a seat bottom 104, a backrest 106 including a headrest 108, a deployable leg rest 110, and left and right armrests 112. The passenger seat 100 may be equipped with various adjustment mechanisms including actuator driven translational and rotational mechanisms for changing sitting positions, component angles, component relationships, component performance, etc. For example, the seat may adjust between an upright sitting position shown in the drawings and a bed position for sleeping, through various intermediate sitting positions. Frame members generally contribute to support while cushions and dress covers generally contribute to comfort. Dress covers and closeouts further contribute to the seat aesthetics.

Figure 1A:
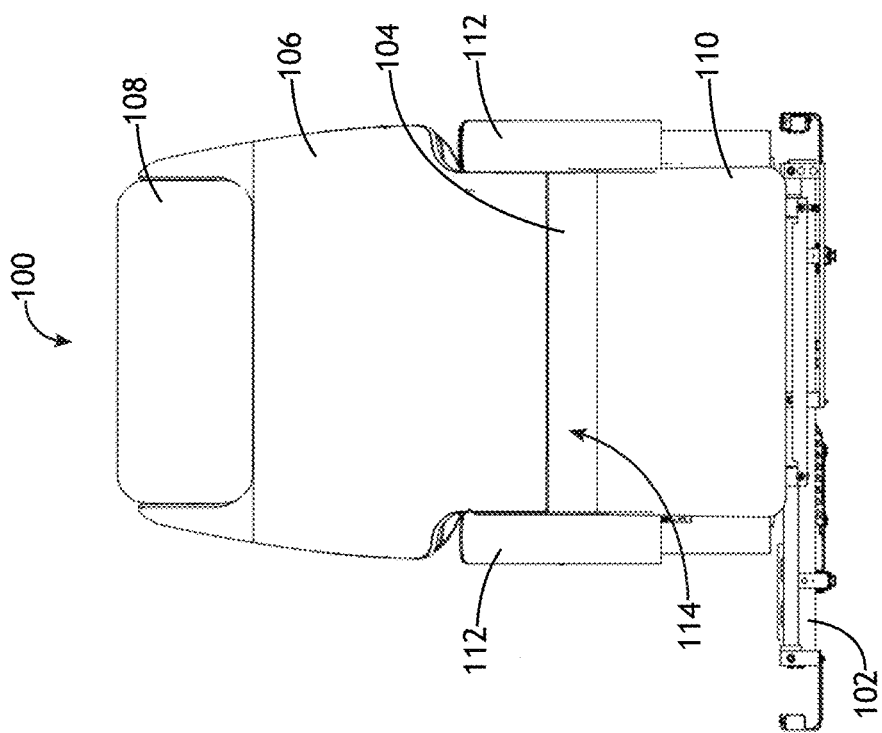
FIG. 1A is a front view of a passenger seat according to an embodiment of the present disclosure.

FIGS. 1A and 2A show the "first" armrest position or seat condition in which the armrests 112 are positioned laterally inward and the seat cushion 114 contracted. FIGS. 1B and 2B show the "second" armrest position or seat condition in which the armrests 112 are repositioned laterally outward and the seat cushion 114 expanded. In some embodiments, the seat cushion 114 is continuous from end-to-end and includes a middle portion 116 positioned between expandable side portions 118. In some embodiments, the seat cushion 114 includes separate middle and side portions. In embodiments, the side portions 118 are configured to expand and contract automatically in conjunction with lateral armrest repositioning. For example, repositioning the armrests laterally inward causes an element to compress the at least one expandable cushion element, and repositioning the armrests laterally outward relaxes or removes the compressive force acting on the at least one expandable cushion element.

Figure 3:
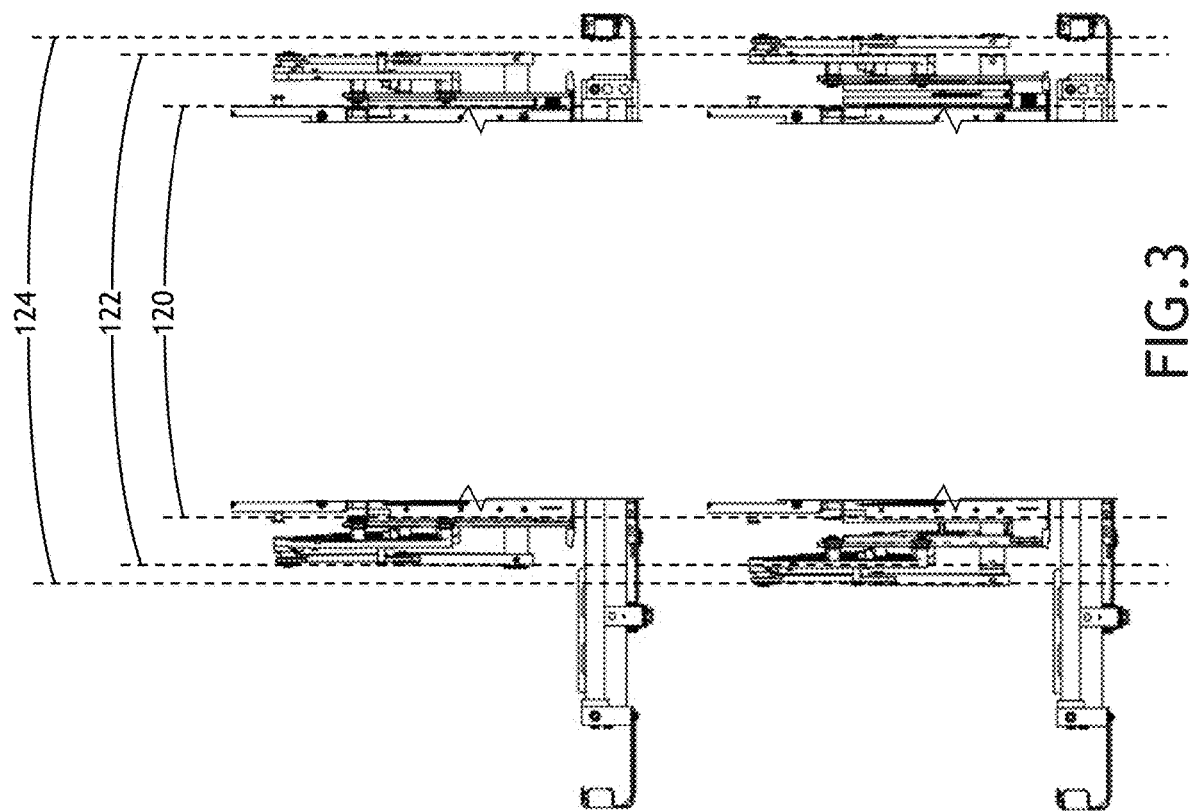
FIG. 3 is a comparative view of seat elements showing the first and second lateral armrests positions.

FIG. 3 shows a comparison of the first and second lateral armrests positions. Reference lines 120 indicate the position of the fixed longitudinal seat frame members for a comparative reference. As used herein, the term "fixed" is with regard to the armrests and their adjustment mechanisms. It is understood that the seat may be equipped with other adjustment mechanisms configured to change the seat frame position in the aircraft or angle. Reference lines 122 indicate the first, normal or contracted position on the armrests. Reference lines 124 indicate the second, occasional or expanded position of the armrests. In embodiments, the armrests move laterally outward, independently or preferably in conjunction, from the contracted condition to the expanded condition, and laterally inward, independently or preferably in conjunction, from the expanded condition to the contracted condition. The difference between the first and second positions may be subtle as shown in FIG. 3, for instance a few centimeters change, or more pronounced if desired depending on the seat construction and application.

Figure 4A:
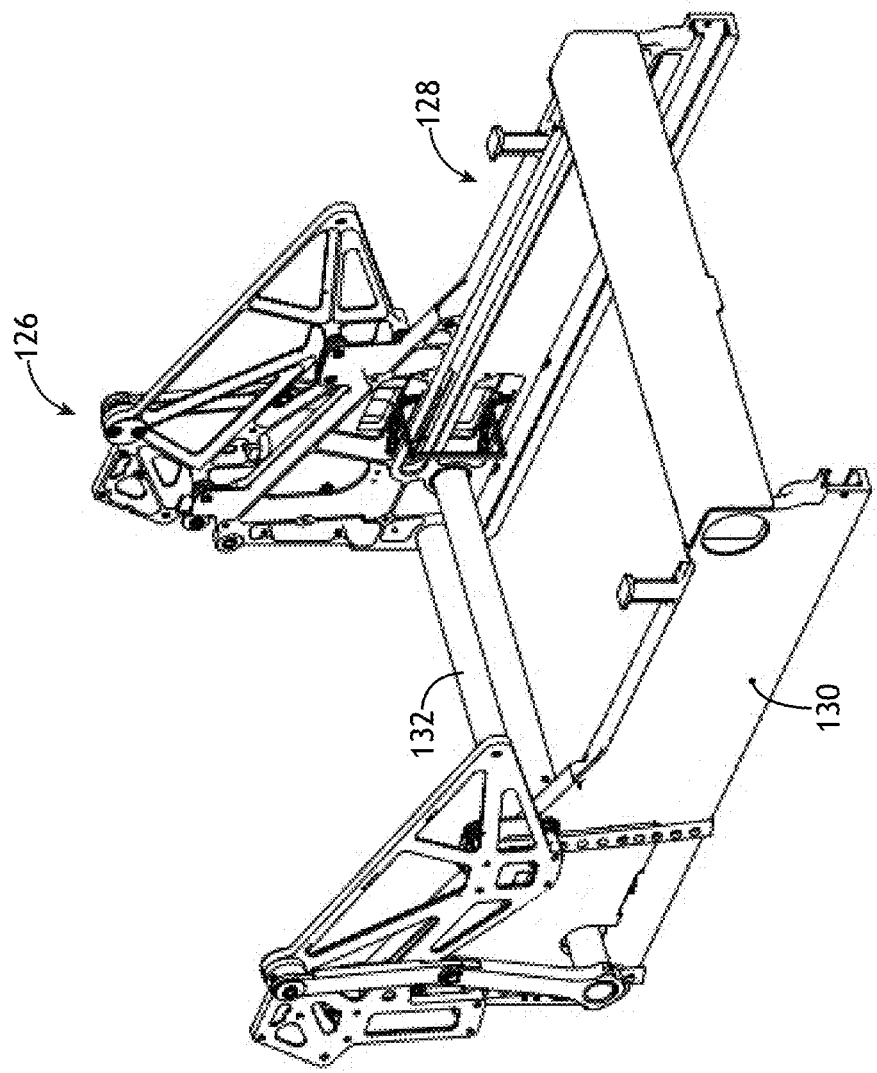
FIG. 4A is a rear isometric view of seat frame elements.

FIG. 4A shows the seat frame assembly 126. In some embodiments, the frame assembly 126 includes a lower carriage assembly 128, also referred to herein as a lower frame assembly, configured to translate forward and aft as the seat adjusts between upright and reclined. The lower frame assembly 128 generally includes spaced longitudinal frame members 130 interconnected through transverse frame members 132, for instance transverse beam tubes. The transverse frame members 132 support and maintain squareness of the lower frame assembly and further serve to attach and guide additional components as discussed further below.

Figure 4B:
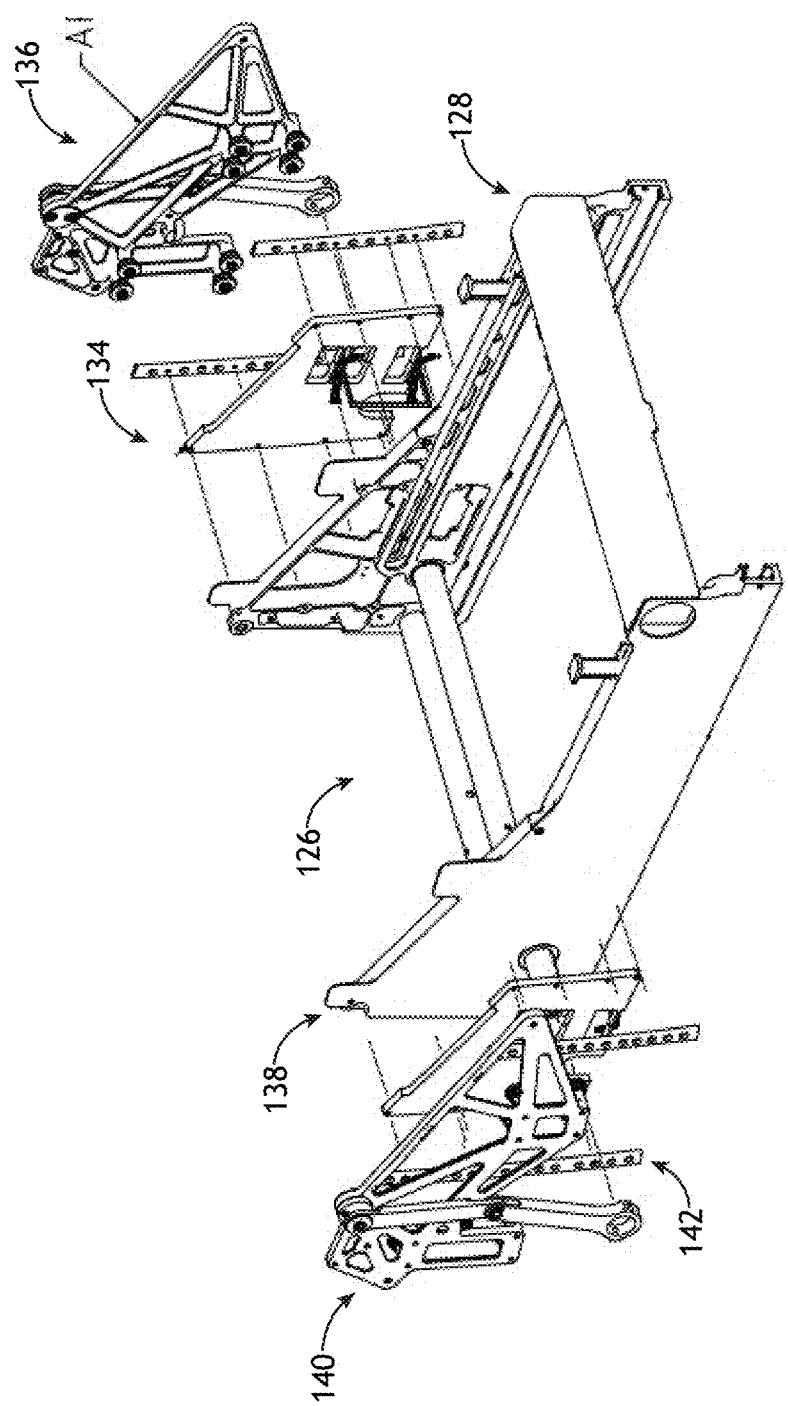
FIG. 4B is an exploded view of the seat frame elements of FIG. 4A.

FIG. 4B shows the disassembled state of the frame assembly 126. The frame assembly 126 generally includes the lower carriage assembly 128, a first lateral adjustment mechanism 134 movably coupled to the first lateral side (e.g., right side) of the lower frame assembly 126, a first armrest mechanism 136 attached to an outboard lateral side of the first lateral adjustment mechanism 134, a second lateral adjustment mechanism 138 movably coupled to a second lateral side (e.g., left side) of the lower frame assembly 126, and a second armrest mechanism 140 (e.g., left side armrest) attached to an outboard lateral side of the second lateral adjustment mechanism 138.

In use, the first or right-side lateral adjustment mechanism 134 operates to laterally reposition the first or right-side armrest mechanism 136, and the second or left-side lateral adjustment mechanism 138 operates to laterally reposition the second or left side armrest mechanism 140. The right-side armrest is carried by the right-side adjustment mechanism and the left-side armrest is carried by the left-side adjustment mechanism such that the right and left side armrests reposition laterally with their respective adjustment mechanism. Each armrest adjustment mechanism is coupled to an armrest (see FIGS. 1A-2B) and may include at least one of a vertical adjustment mechanism 142 and a rotational adjustment mechanism for inducing respective vertical position and angular changes in the armrest.

Figure 5A:
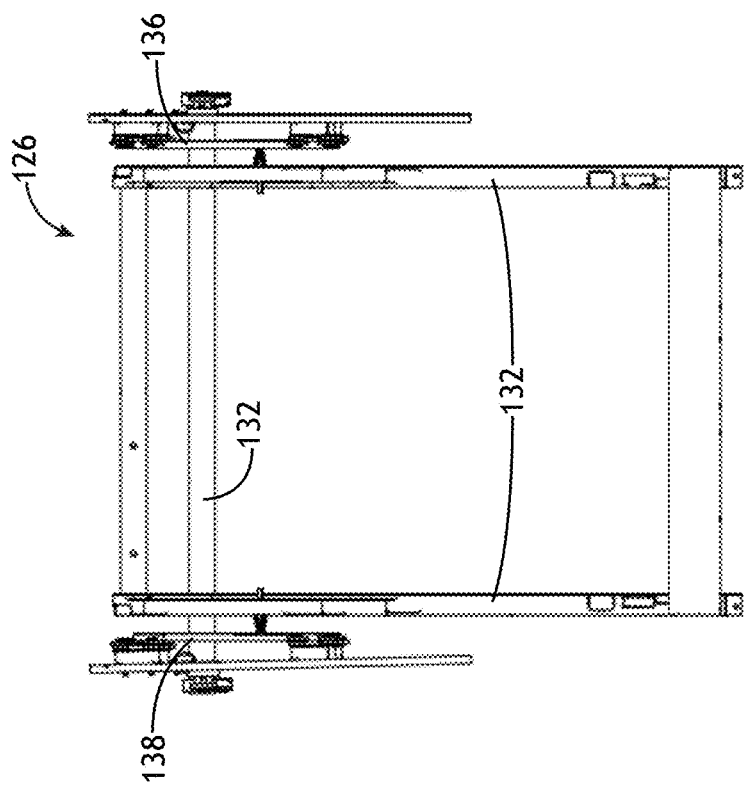
FIG. 5A is a top view of the seat frame elements showing the first armrest position.
Figure 5B:
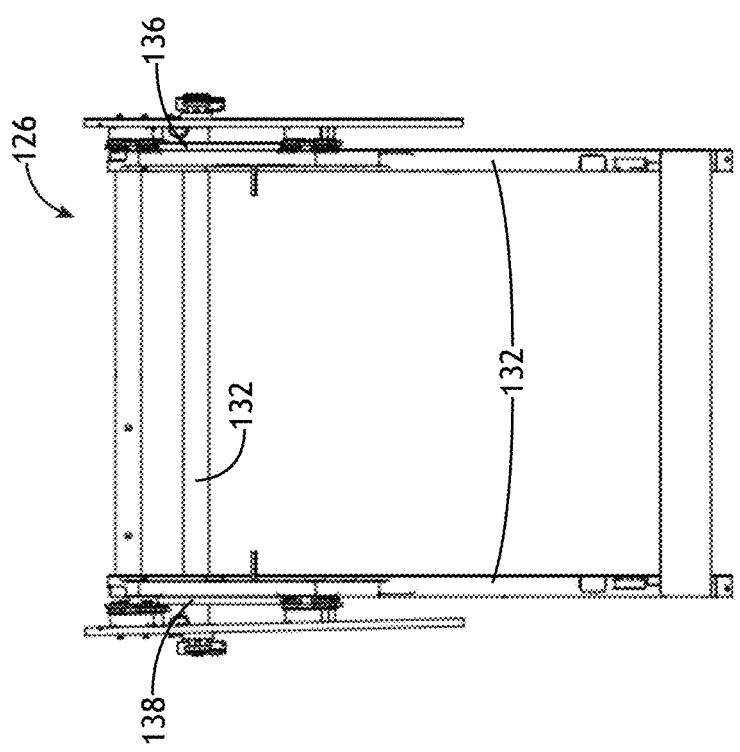
FIG. 5B is a top view of the seat frame elements showing the second armrest position.

FIGS. 5A and 5B show the frame assembly 126 with the lateral adjustment mechanisms 136, 138 attached to illustrate the lateral first and second positions. As shown, the lateral adjustment mechanisms 136, 138 are coupled to the transverse frame member 132 and move toward and apart from the fixed longitudinal frame members 130. As discussed further below, the lateral adjustment mechanisms 136, 138 are driven toward and apart relative to the longitudinal frame members 130 by way of a motion driver and lever arrangement.

Figure 6:
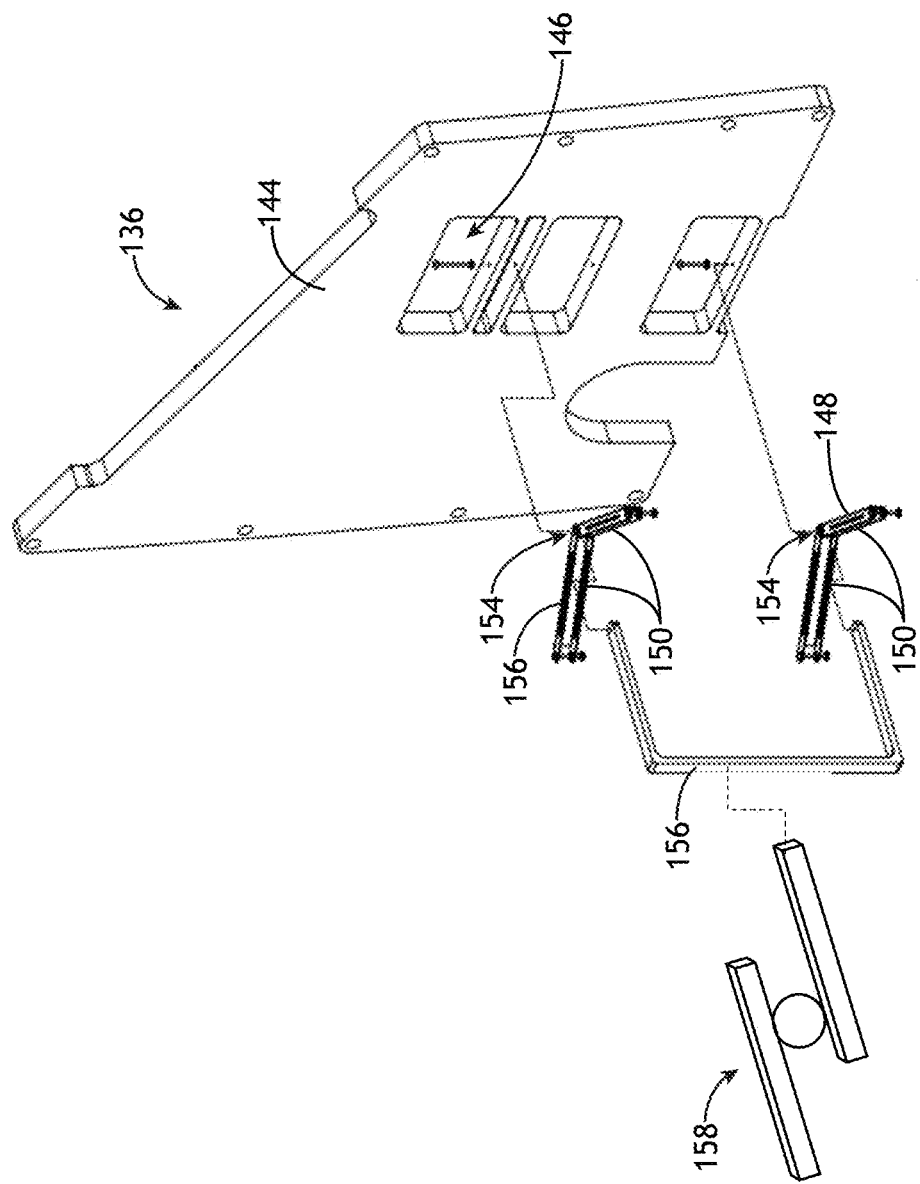
FIG. 6 is an exploded view of an armrest lateral adjustment mechanism.

FIG. 6 shows an embodiment of one of the lateral adjustment mechanisms 136. The mechanism generally includes a frame implemented as a vertical plate 144. Cutouts 146 formed in the plate 144 align in a vertical stack and receive levers 148 held in place using vertical pins 150. Each lever 148 includes a pair of links 152 attached together at a rotating joint 154. Each lever 148 is coupled to the plate 144 using a vertical pin 150. One lever is positioned above the other, for instance in a separate cutout formed in the plate, such that a vertical rotational axis extends through the height of the plate 144. Each lever 148 is further coupled to one end of a connecting frame 156 at its rotating joint 154.

In some embodiments, the connecting frame 156 is C-shaped and includes a first or top leg and a second or bottom leg. The top leg is associated with the top lever and the bottom leg is associated with the bottom lever in a vertical arrangement. The connecting frame 156 is further coupled to a motion driver, for instance a rack-and-pinion assembly 158 shown schematically in FIG. 6, an actuator such as a linear or rotary actuator, or other mechanism for causing relative motion. In use, the rack-and-pinion assembly 158 is coupled at opposing ends to the right and left connecting frames of the opposing lateral adjustment mechanisms 136, 138 such that activation of the assembly drives movement of the connecting frames in opposite directions thereby increasing or decreasing the distance between the armrests.

Figure 7A:
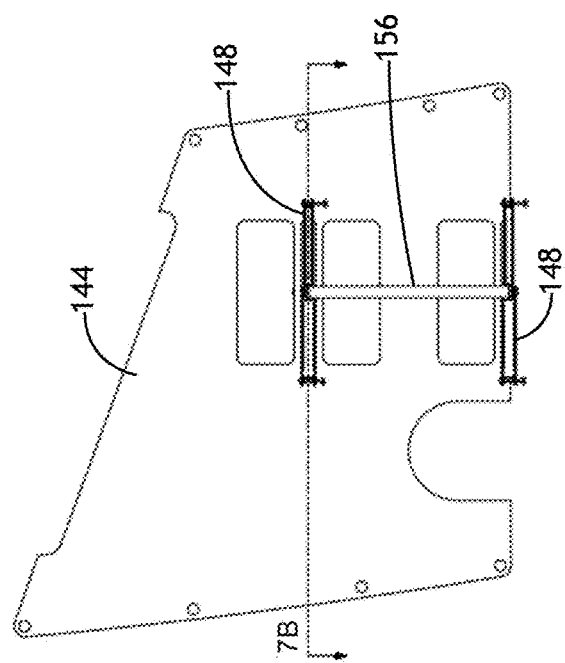
FIG. 7A is a side view of the armrest lateral adjustment mechanism of FIG. 6 shown retracted.
Figure 7B:
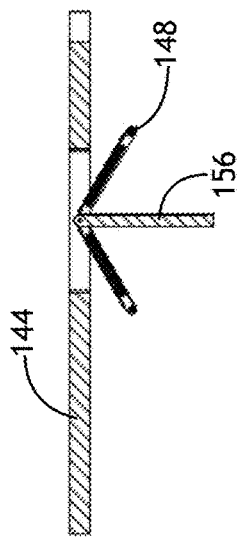
FIG. 7B is a cross sectional view of FIG. 7A taken along line A-A.
Figure 8A:
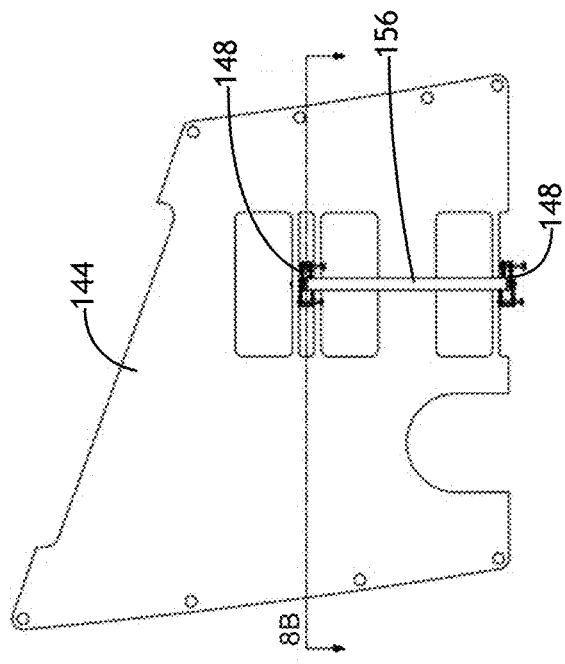
FIG. 8A is a side view of the armrest lateral adjustment mechanism shown expanded.
Figure 8B:
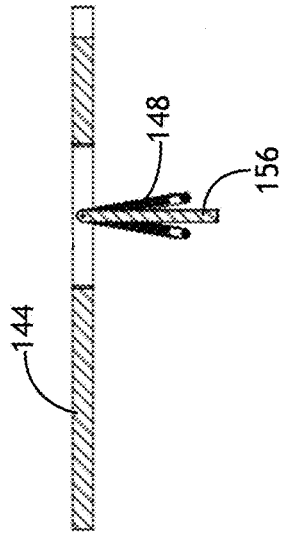
FIG. 8B is a cross sectional view of FIG. 8A taken along line B-B.

Referring to FIGS. 7A-8B, driving the connecting frames 156 laterally outward relative to the frame assembly drives the frame 144 laterally outward away from the frame assembly, and driving the connecting frames 156 laterally inward relative to the frame assembly drives the frame 144 laterally inward toward the frame assembly. The ends of the levers 148 (shown detached in FIGS. 7A-8B and attached to the frame assembly in FIGS. 5A and 5B) pivotally attach to the frame assembly, for instance to the longitudinal frame members. FIGS. 7A and 7B shown the lever ends diverged to position the frame 144 nearest the frame assembly. FIGS. 8A and 8B show the lever ends converged to position the frame 144 farthest the frame assembly. As discussed above, the action of the motion driver drives the motion of the connecting frame 156 and consequently the lever action.

FIGS. 9A and 9B show cushion expansion and contraction schematically. As shown, the cushion includes a center portion 116 and at least one expandable side portion implemented as a bellows 160, and preferably an expandable side portion or bellows positioned on each lateral side of the center portion 116. In some embodiments, the cushion may be integrally formed. In other embodiments, the center and side portions may be separate. In a particular embodiment, the cushion may be pneumatically actuated via a compressed air source. FIG. 9A shows air flow into and out of the expandable side portions. In some embodiments, inflation of the expandable portions drives armrest positioning laterally outward while evacuation of air allows the armrests to return to their inward position, for instance via force of a return mechanism such as a return spring.

FIGS. 10A-C show sequential cushion expansion driven by armrest repositioning. As shown, each side portion 116 includes voids forming a bellow. When compressed by the lateral adjustment mechanism as shown in FIG. 10A, for instance compressed by the frame (144 as shown in FIG. 6), the material voids contract to decrease the width of the cushion. When decompressed as shown in FIG. 10B, the material voids return to their resting state. When stretched, as shown in FIG. 10C, the material voids are expanded. In some embodiments, the lateral side of the expandable portion is coupled to the inboard side of the frame such that the cushion moves with the frame to follow and fill the formed gap.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A passenger seat, comprising:
   a frame assembly including spaced longitudinal frame members and at least one transverse frame member;
   a first lateral adjustment mechanism movably attached to a first lateral side of the frame assembly;
   a first armrest mechanism positioned on an outboard lateral side of the first lateral adjustment mechanism;
   a second lateral adjustment mechanism movably attached to a second lateral side of the frame assembly;
   a second armrest mechanism positioned on an outboard lateral side of the second lateral adjustment mechanism; and
   a cushion element supported by the frame assembly, the cushion element including at least one laterally expandable portion;
   wherein the at least one laterally expandable portion is configured to automatically expand as the respective first and second armrest mechanisms are repositioned laterally outward, and automatically contract as the respective first and second armrest mechanisms are repositioned laterally inward.

2. The passenger seat according to claim 1, wherein each of the first and second lateral adjustment mechanisms comprises:
   a frame;
   spaced first and second levers each including first and second links attached at a rotating joint, each of the first and second links configured to interact with the frame assembly; and
   a connecting frame including a first leg attached to the first lever and a second leg attached to the second lever;
   wherein, in use, driving the connecting frame laterally outward relative to the frame assembly drives the frame laterally outward relative to the lower frame assembly, and driving the connecting frame laterally inward relative to the lower frame assembly drives the frame laterally inward toward the lower frame assembly.

3. The passenger seat according to claim 2, wherein:
   the frame includes a vertical plate; and
   the connecting frame is oriented perpendicular to the plate and is configured to be driven laterally inward or outward via a rack-and-pinion assembly.

4. The passenger seat according to claim 1, wherein each of the first and second armrest mechanisms comprises:
   an armrest; and
   at least one of a vertical armrest adjustment mechanism and a rotational armrest adjustment mechanism.

5. The passenger seat according to claim 1, further comprising a rack-and-pinion mechanism positioned in the lower frame assembly coupled to each of the first and second lateral adjustment mechanisms.

6. The passenger seat according to claim 1, wherein the at least one laterally expandable portion is implemented as a bellow including material voids formed in the cushion.

7. The passenger seat according to claim 1, wherein the at least one laterally expandable portion is pneumatically actuated.

8. The passenger seat according to claim 1, wherein the at least one transverse frame member comprises a beam tube coupled to each of the first and second armrest mechanisms.

9. An armrest mechanism for laterally repositioning an armrest relative to a seat, comprising:

a frame movably attachable to a lateral side of a seat frame;

at least one lever configured to adjust lateral spacing between the frame and the seat frame, the at least one lever including spaced first and second levers links attached at a rotating joint, the first and second links configured to interact with the seat frame;

a connecting frame configured to couple the at least one lever to the seat frame;

an armrest assembly attached to the frame; and a motion driver coupled to the connecting frame operable for moving the connecting frame relative to the seat frame.

10. The armrest mechanism according to claim 9, wherein the armrest assembly comprises:

an armrest; and at least one of a vertical adjustment mechanism for vertically repositioning the armrest and a rotational adjustment mechanism for angularly repositioning the armrest.

11. The armrest mechanism according to claim 9, wherein:

the frame is a vertical plate; and the connecting frame is oriented perpendicular to the vertical plate.

12. The armrest mechanism according to claim 9, wherein:

the at least one lever includes a first lever and a second lever spaced vertically apart; and the connecting frame includes a first leg coupled to the first lever and a second leg coupled to the second lever;

in use, driving the connecting frame in a first direction causes opposing ends of each of the first and second levers to converge and driving the connecting frame in a second direction opposite the first direction causes the opposing end of each of the first and second levers to diverge, wherein the opposing ends of each of the first and second levers are configured to interact with the seat frame.

13. The armrest mechanism according to claim 12, wherein each of the rotating joint of the first lever, the first leg, the rotating joint of the second lever, and the second leg is coupled to the frame through a vertical pivot axis formed through the frame.

14. The armrest mechanism according to claim 12, wherein each of the first and second levers operates in a horizontal plane.

15. The armrest mechanism according to claim 9, wherein the motion driver is a rack-and-pinion assembly.

\* \* \* \* \*